(12) United States Patent
Nakamura et al.

(10) Patent No.: US 8,289,404 B2
(45) Date of Patent: Oct. 16, 2012

(54) IMAGING CAPTURE DEVICE WITH BLUR COMPENSATION

(75) Inventors: Masatoshi Nakamura, Kyoto (JP); Yoshiyuki Kishimoto, Osaka (JP); Yasunori Kishi, Osaka (JP)

(73) Assignee: Panasonic Corporation, Osaka (JP)

( * ) Notice: Subject to any disclaimer, the term of this patent is extended or adjusted under 35 U.S.C. 154(b) by 424 days.

(21) Appl. No.: 12/374,356

(22) PCT Filed: Jul. 19, 2007

(86) PCT No.: PCT/JP2007/064284
§ 371 (c)(1),
(2), (4) Date: Jan. 19, 2009

(87) PCT Pub. No.: WO2008/010559
PCT Pub. Date: Jan. 24, 2008

(65) Prior Publication Data
US 2009/0251550 A1    Oct. 8, 2009

(30) Foreign Application Priority Data

Jul. 20, 2006  (JP) .................................. 2006-197902

(51) Int. Cl.
*H04N 5/228* (2006.01)
*H04N 5/235* (2006.01)
*G03B 7/00* (2006.01)

(52) U.S. Cl. ............. 348/208.5; 348/208.7; 348/208.12; 348/362

(58) Field of Classification Search ............. 348/208.99, 348/208.1, 208.2, 208.3, 208.4, 208.7, 208.8, 348/208.11, 208.5, 208.6, 296, 362, 367, 348/369, 208.12
See application file for complete search history.

(56) References Cited

U.S. PATENT DOCUMENTS

| | | | |
|---|---|---|---|
| 5,030,984 A * | 7/1991 | Buckler et al. | 396/153 |
| 5,220,375 A | 6/1993 | Ishida et al. | |
| 5,245,378 A | 9/1993 | Washisu | |
| 5,729,290 A * | 3/1998 | Tokumitsu et al. | 348/349 |
| 5,761,545 A * | 6/1998 | Tanaka et al. | 396/53 |
| 5,809,353 A * | 9/1998 | Hirano | 396/55 |
| 6,272,289 B1 * | 8/2001 | Washisu | 396/55 |

(Continued)

FOREIGN PATENT DOCUMENTS

EP          0388936          9/1990

(Continued)

OTHER PUBLICATIONS

Supplementary European Search Report for corresponding Application No. 07791037.0 issued Aug. 20, 2009.

(Continued)

*Primary Examiner* — Nicholas Giles
(74) *Attorney, Agent, or Firm* — Renner, Otto, Boisselle & Sklar, LLP

(57) ABSTRACT

An image capture device that can shoot an image at a more appropriate exposure value with the image blur compensated for properly is provided.

The digital camera includes: a motion detecting section 34 for estimating a motion vector of an image shot; a blur compensating section for optically compensating for the blur of the image shot; a mode selecting section for selecting one of multiple control modes for the blur compensating section; and a setting determining section for determining a setting related to an exposure value for shooting an image based on the control mode selected by the mode selecting section and the motion vector estimated.

4 Claims, 5 Drawing Sheets

U.S. PATENT DOCUMENTS

| | | |
|---|---|---|
| 6,778,210 B1 * | 8/2004 | Sugahara et al. .......... 348/208.4 |
| 7,030,911 B1 | 4/2006 | Kubo |
| 7,064,777 B2 * | 6/2006 | Yamazaki .................. 348/208.5 |
| 7,292,270 B2 * | 11/2007 | Higurashi et al. ......... 348/208.3 |
| 7,522,188 B2 * | 4/2009 | Tomita et al. ............ 348/208.11 |
| 7,701,484 B2 * | 4/2010 | Habe ........................ 348/208.12 |
| 7,791,643 B2 * | 9/2010 | Stavely ...................... 348/208.2 |
| 2001/0022619 A1 * | 9/2001 | Nishiwaki ..................... 348/208 |
| 2005/0062852 A1 * | 3/2005 | Yamazaki .................. 348/208.6 |
| 2005/0248660 A1 | 11/2005 | Stavely et al. |
| 2005/0270380 A1 | 12/2005 | Tomita et al. |
| 2009/0251550 A1 * | 10/2009 | Nakamura et al. ......... 348/208.4 |
| 2010/0277605 A1 * | 11/2010 | Nozaki et al. .............. 348/208.4 |

FOREIGN PATENT DOCUMENTS

| | | |
|---|---|---|
| EP | 1672914 | 6/2006 |
| JP | 08-327917 | 12/1996 |
| JP | 2001-103366 | 4/2001 |
| JP | 2005-266480 | 9/2005 |
| JP | 2005-321806 | 11/2005 |
| JP | 2006-033578 | 2/2006 |
| JP | 2006-065103 | 3/2006 |
| JP | 2006-171654 | 6/2006 |
| JP | 2006-186796 | 7/2006 |

OTHER PUBLICATIONS

Tokushu "Tebure Hosei" Full Katsuyo, *Digital Camera Magazine*, Sep. 1, 2004, vol. 5, No. 9, p. 67.

International Search Report for corresponding Application No. PCT/JP2007/064284 mailed Aug. 21, 2007.

*Digital Camera Magazine*, Sep. 1, 2004, vol. 5, No. 9, p. 67.

* cited by examiner

IMAGING CAPTURE DEVICE WITH BLUR COMPENSATION

TECHNICAL FIELD

The present invention relates to an image capture device that can change the shutter speeds of a mechanical shutter and/or an electronic shutter, and more particularly relates to an image capture device with an image stabilizing function.

BACKGROUND ART

Recently, digital still cameras with an image stabilizing function have been developed and put on sale one after another. The image can be stabilized either by optically compensating for the blur of the subject's image or by increasing the shutter speed with the sensitivity of the imager increased.

An image capture device with such a function is disclosed in Patent Document No. 1. The device is designed to estimate the motion vector of an image being shot and determine the shutter speed based on that motion vector. In this manner, the image blur caused by a motion of the subject can be reduced and the SNR of the image information can be increased while an image of a still subject is being shot.

Patent Document No. 1: Japanese Patent Application Laid-Open Publication No. 8-327917

DISCLOSURE OF INVENTION

Problems to be Solved by the Invention

However, it was discovered that if an image capture device with an optical image stabilizing function that could be performed in any of multiple selectable control modes had its shutter speed adjusted according to the motion vector, some problems occurred.

More specifically, according to the image stabilizing control mode selected, the magnitudes of motion vectors estimated could be different even if the magnitude of shake of the image capture device was the same. It was discovered that if the exposure were adjusted in such a situation just by the magnitude of motion vector, then an inappropriate exposure value could be selected for the magnitude of actual camera shake. That is to say, even if the image shot were not actually blurred so much, the exposure value could be unnecessarily small.

In order to overcome the problems described above, the present invention has an object of providing an image capture device that can shoot an image at a more appropriate exposure value with the image blur compensated for properly.

Means for Solving the Problems

To achieve this object, an image capture device according to the present invention is designed to adjust an exposure value for shooting an image. The device includes: a motion detecting section for detecting a motion of an image shot; a blur compensating section for optically compensating for a blur of the image shot; a mode selecting section for selecting one of multiple control modes for the blur compensating section; and a setting determining section for determining a setting related to an exposure value for shooting an image based on the control mode selected by the mode selecting section and the motion of the image shot that has been detected.

Then, the exposure value can be adjusted according to the control mode to perform the image stabilizing function. As a result, the problem with the conventional device that may have an inappropriate exposure value according to the image stabilizing function control mode can be overcome.

In one preferred embodiment, the image capture device of the present invention may be able to control an exposure value for shooting an image by adjusting a shutter speed of a mechanical shutter and/or an electronic shutter. In that case, the setting determining section determines the shutter speed based on the control mode selected and the motion of the image shot that has been detected.

Then, the shutter speed can be adjusted according to the control mode to perform the image stabilizing function. As a result, the problem with the conventional device that may have an inappropriate exposure value according to the image stabilizing function control mode can be overcome.

The control modes of the blur compensating section may include a first control mode and a second control mode. In the first control mode, the blur compensating section continues to compensate for the blur of the image shot through a period from shooting one still picture to shooting the next still picture. In the second control mode, a session that the blur compensating section either suspends or attenuates the operation of compensating for the blur of the image shot exists during the period.

In a situation where the motion of the image shot that has been detected by the motion detecting section has a predetermined value, if the control mode selected is the first control mode, the setting determining section may select a first setting as the exposure value. But if the control mode selected is the second control mode, the setting determining section may select a second setting as the exposure value. In that case, the exposure value to shoot an image is greater when the second setting is selected than when the first setting is selected.

Effects of the Invention

Thus, the present invention provides an image capture device that can shoot an image at a more appropriate exposure value with the image blur compensated for properly.

Figure 1:
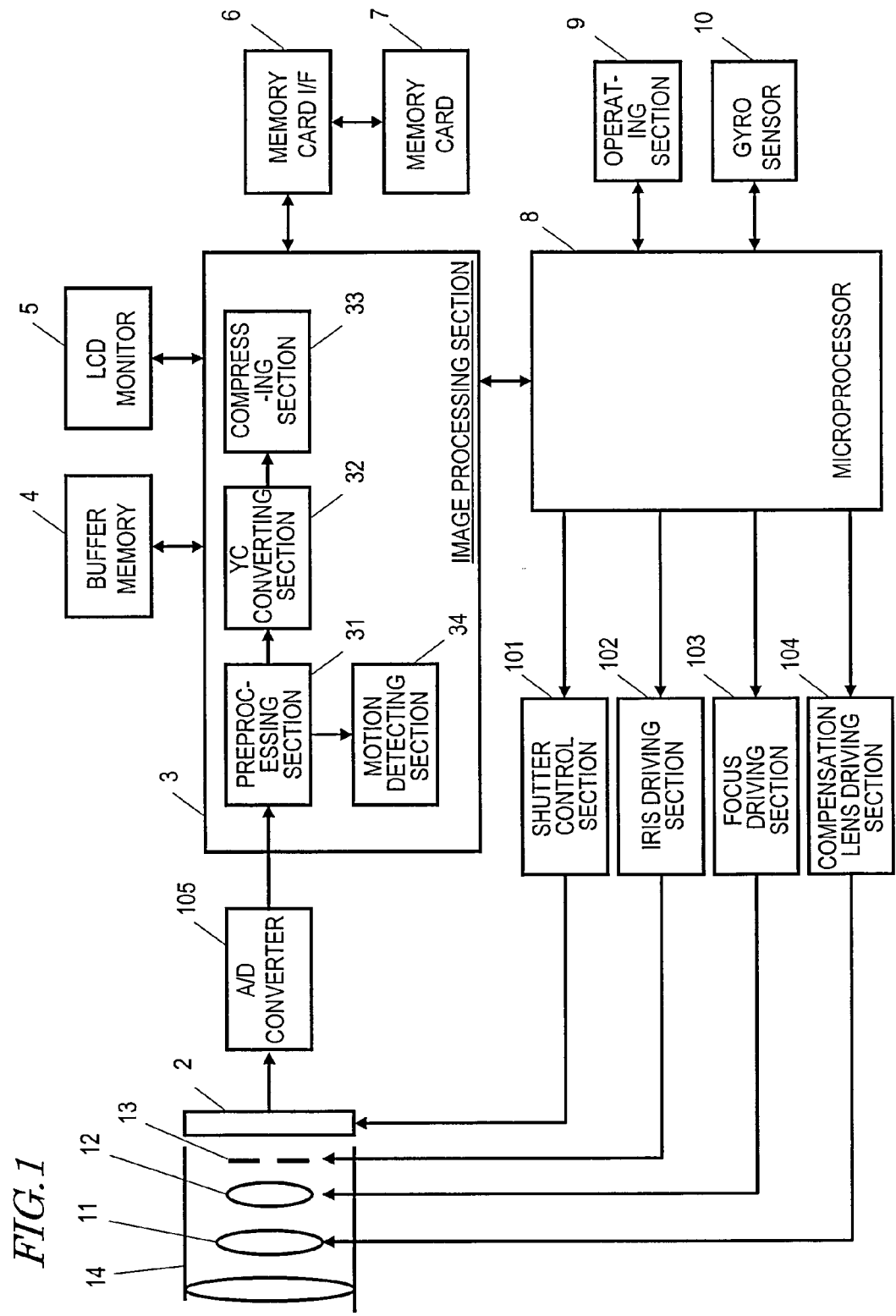
FIG. 1 is a block diagram illustrating a configuration for a digital camera as a first preferred embodiment of the present invention.

DESCRIPTION OF REFERENCE NUMERALS 2 imager
8 microprocessor
9 operating section
10 gyro sensor
11 image stabilizer lens 34 motion detecting section
101 shutter control section
104 compensation lens driving section

BEST MODE FOR CARRYING OUT THE INVENTION

Embodiment 1

1. Configuration 1-1. Overall Configuration

FIG. 1 is a block diagram illustrating a configuration for a digital camera according to the present invention. As shown in FIG. 1, the camera includes a lens barrel 14, an imager 2, an image processing section 3, and a microprocessor 8 for controlling the digital camera. As the imager 2, a CCD image sensor, a CMOS image sensor or an NMOS image sensor may be used. The image processing section 3 and the microprocessor 8 may be implemented as pieces of hardware with or without a software program installed for a microcomputer.

The lens barrel 14 includes an image stabilizer lens 11, a focus lens 12 and an iris 13. The image stabilizer lens 11 can move within a plane that intersects with the optical axis of the lens barrel 14 at right angles. Thus, by moving the image stabilizer lens 11 within that plane according to the magnitude of the camera shake, the blur of the subject's image that has been produced on the imager 2 can be compensated for.

The imager 2 converts the image, which has entered the camera through the lens barrel, into an electrical signal (i.e., analog data). Next, an A/D converter 105 converts the electrical signal that has been generated by the imager 2 into digital image data.

The image processing section 3 includes a preprocessing section 31, a YC converting section 32, a compressing section 33, and a motion detecting section 34. The preprocessing section 34 performs various types of processing such as gain correction, gamma correction, white balance correction and flaw correction on the input digital image data that has come from the A/D converter 105. The YC converting section 32 separates the preprocessed image data into a color difference signal and a luminance signal. The compressing section 33 subjects the YC converted image data to compression processing. Optionally, the compressing section 33 may also have the function of expanding the compressed image data that has been read out from a memory card 7. A buffer memory 4 is used as a temporary work area to get these types of processing done. The compressed image data is written on the memory card 7 by way of a memory card I/F 6. The images that are stored in the buffer memory 4 and the memory card 7 can be reproduced on an LCD monitor 5.

In accordance with a command entered through the operating section 9, the microprocessor 8 controls the overall system of this digital camera including the image processing section 3, a shutter control section 101, an iris driving section 102 and a focus driving section 103. Also, based on the magnitude of the camera shake that has been detected by a gyro sensor 10, the microprocessor 8 controls a compensation lens driving section 104 so as to minimize the blur of the subject's image that has been produced on the imager 2.

1-2. Configuration for Motion Detecting Section

Figure 2:
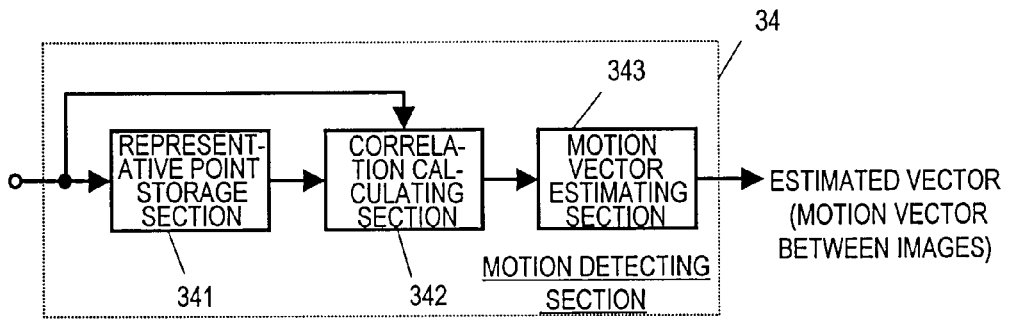
FIG. 2 is a block diagram illustrating a configuration for the motion detecting section.

FIG. 2 is a block diagram illustrating a configuration for the motion detecting section 34, which detects the motion of an image based on the image data that has been generated by the imager 2. The motion detecting section 34 includes a representative point storage section 341, a correlation calculating section 342 and a motion vector estimating section 343.

The representative point storage section 341 divides the image signal representing a current frame, which has been supplied from the preprocessing section 31, into a plurality of areas and stores an image signal, associated with a particular representative point included in each of those areas, as a representative point signal. Also, the representative point storage section 341 reads the representative point of the previous frame that has already been stored and passes it to the correlation calculating section 342.

The correlation calculating section 342 gets the representative point signal of the previous frame from the representative point storage section 341 and also gets the image data of the current frame from the preprocessing section 31, and then calculates the degree of correlation between the representative point signal of the previous frame and the image data of the current frame. This correlation calculation can be done by comparing the difference between the representative point signal of the previous frame and the image signal of the current frame. Thereafter, the output of the correlation calculating section 342 is given to the motion vector estimating section 343.

Based on the result of calculation made by the correlation calculating section 342, the motion vector estimating section 343 estimates the motion vector between the previous and current frames of the image. If an image element that appeared in the previous frame has moved to a different location in the current frame, the motion vector represents the magnitude and direction of that motion.

1-3. Modes of Optical Image Stabilization

The digital camera of this preferred embodiment has at least two modes for controlling the image stabilization operation. That is to say, the microprocessor 8 has at least two modes for controlling the compensation lens driving section 104. Hereinafter, those control modes will be described with reference to FIGS. 3 and 4, which schematically show the modes for compensating for the image blur of the digital camera.

Figure 3:
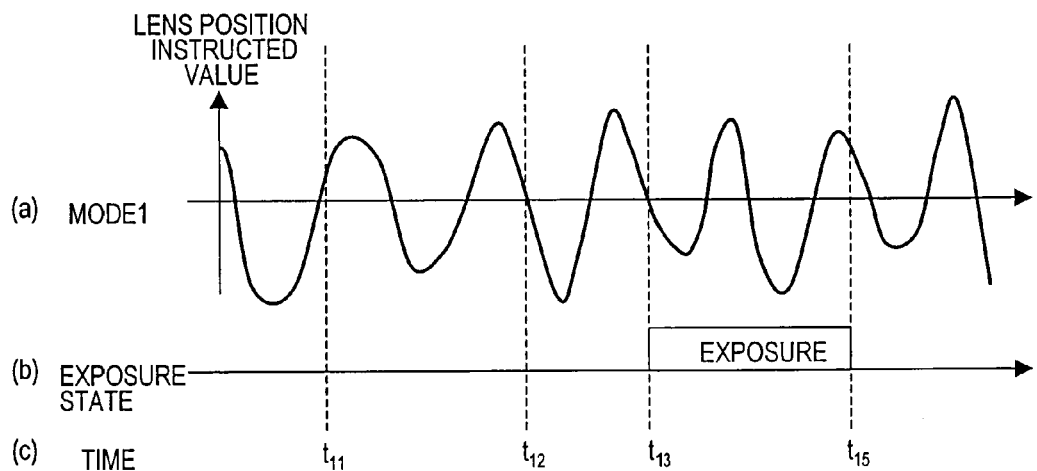
FIG. 3 schematically shows how to perform an image stabilization operation in MODE 1.

FIG. 3 shows the connection between the exposure state of the imager 2 and the lens position instructed value, which is given by the microprocessor 8 to the compensation lens driving section 104, in a situation where the microprocessor 8 is controlling the compensation lens driving section 104 in a control mode called "MODE 1". More specifically, portion (a) of FIG. 3 shows how the lens position instructed value output by the microprocessor 8 changes with time. Portion (b) of FIG. 3 shows how the exposure state of the imager 2 changes. And portion (c) of FIG. 3 shows the times of occurrence of respective events. In this example, the respective events and the times are supposed to have the following correspondence. Specifically, the shutter release button is supposed to be pressed halfway at a time t11 and pressed fully at a time t13, and then the imager 2 is supposed to be subjected to an exposure operation between the times t13 and t15. As shown in FIG. 3, in the interval between a session of shooting one still picture and the next session of shooting another still picture, the microprocessor 8 has the compensation lens driving section 104 continue to perform the operation of compensating for the blur of the image shot. Hereinafter, this control mode will be referred to herein as "MODE 1". Although not shown in FIG. 1, the shutter release button forms part of the operating section 9.

By making the microprocessor 8 control the compensation lens driving section 104 in MODE 1, the image stabilization can be done even while a still picture is not being shot. For example, the image stabilization control can also be performed on a through-the-lens image for use to determine the composition of a still picture. Also, in MODE 1, the microprocessor 8 can drive the compensation lens driving section 104 irrespective of the exposure state of the imager 2, and therefore, the image stabilization operation can be controlled relatively easily.

Figure 4:
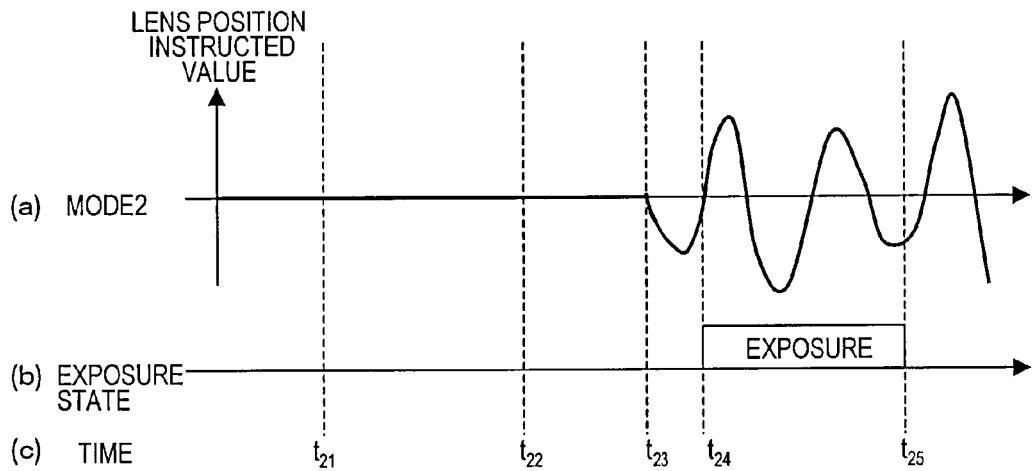
FIG. 4 schematically shows how to perform an image stabilization operation in MODE 2.

FIG. 4 shows the connection between the exposure state of the imager 2 and the lens position instructed value, which is given by the microprocessor 8 to the compensation lens driving section 104, in a situation where the microprocessor 8 is controlling the compensation lens driving section 104 in a control mode called "MODE 2". More specifically, portion (a) of FIG. 4 shows how the lens position instructed value output by the microprocessor 8 changes with time. Portion (b) of FIG. 4 shows how the exposure state of the imager 2 changes. And portion (c) of FIG. 4 shows the times of occurrence of respective events. In this example, the respective events and the times are supposed to have the following correspondence. Specifically, the shutter release button is supposed to be pressed halfway at a time t21 and pressed fully at a time t23, and then the imager 2 is supposed to be subjected to an exposure operation between the times t24 and t25. As shown in FIG. 4, in the interval between a session of shooting one still picture and the next session of shooting another still picture, there exists period that the microprocessor 8 has the compensation lens driving section 104 suspend the operation of compensating for the blur of the image shot. Hereinafter, this control mode will be referred to herein as "MODE 2".

By making the microprocessor 8 control the compensation lens driving section 104 in MODE 2, the image stabilizer lens 11 is driven only when it is necessary to do that to shoot a still picture. That is to say, since the image stabilizer lens 11 is not driven when it is not necessary, the power that would otherwise be dissipated by the compensation lens driving section 104 can be saved. As shown in FIG. 4, even during the interval between the times t23 and t24, the image stabilization function is kept ON. This is done in order to perform the image stabilization operation with good stability during the exposure period by performing the exposure operation after the image stabilization function has been turned ON in advance. The image stabilization function is not turned OFF right after the exposure period is over. This is also done in order to perform the image stabilization operation with good stability during the exposure period. That is why when we say "the image stabilizer lens 11 is driven only when it is necessary to do that to shoot a still picture", the image stabilization function is turned ON not only during the exposure period (i.e., from the time t24 through the time t25) but also during the pre-exposure period (i.e., from the time t23 through the time t24) and the post-exposure period (i.e., from the time t25 on).

In MODE 2, other than the necessary control period (i.e., from the time t23 through the time t25) to shoot a still picture, the lens position instructed value is supposed to be constant. However, the present invention is in no way limited to that specific preferred embodiment. For example, the lens position instructed value other than the necessary control period (i.e., from the time t23 through the time t25) to shoot a still picture may be smaller than the one during that necessary control period (i.e., from the time t23 through the time t25) to shoot a still picture, and such a control mode may be used as a new control mode. In short, the present invention is applicable to any situation as long as the microprocessor 8 has multiple modes for controlling the compensation lens driving section 104.

1-4. Correspondence Between this Preferred Embodiment and More General Configuration of the Present Invention The digital camera of this preferred embodiment is an example of image capture device according to the present invention. Another image capture device according to the present invention could be a cellphone with a camera function, for example.

The motion detecting section 34 is an exemplary means for estimating a motion vector. The motion detecting section 34 may be implemented either as a DSP circuit dedicated for estimating a motion vector or by making a general-purpose computer execute a software program for motion detection.

The gyro sensor 10, the microprocessor 8, the compensation lens driving section 104 and the image stabilizer lens 11 together form an exemplary blur compensating means. Another blur compensating means may be provided by replacing the gyro sensor 10 with an angular velocity sensor, for example. Also, although the camera shake is supposed to be compensated for by driving an inner lens in the preferred embodiment described above, the imager 2 may also be driven instead, or even the lens barrel 14 may be driven in its entirety. In short, any other technique may be adopted as long as the blur of the subject's image can be compensated for optically.

The operating section 9 is an exemplary mode selecting means. The operating section 9 may be implemented as a piece of hardware such as a button or a dial. Alternatively, the operating section 9 may also be implemented by presenting characters or images on a screen with a touchscreen panel by software processing and allowing the user to make a contact with the screen. In that case, the operating section 9 is provided as a combination of hardware and software. The microprocessor 8 is an exemplary setting determining means.

2. Operation

Hereinafter, it will be described with reference to the accompanying drawings how the digital camera of this preferred embodiment operates.

2-1. Set Image Stabilization Mode

Figure 5:
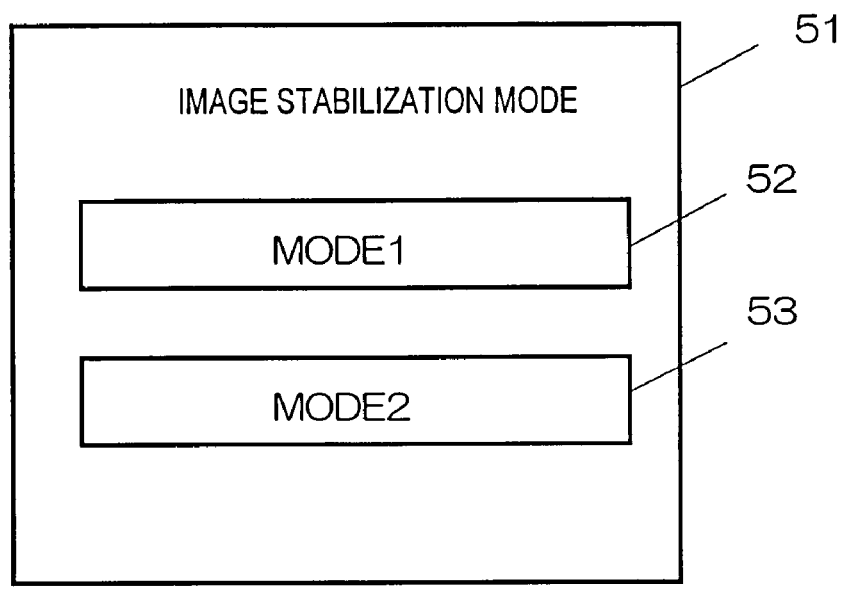
FIG. 5 is a schematic representation illustrating an exemplary menu being displayed on the screen when an image stabilization control mode needs to be selected.

FIG. 5 is a schematic representation illustrating a menu being displayed on the LCD monitor 5 when an image stabilization control mode needs to be selected for the digital camera. This menu 51 is displayed when the user operates the operating section 9. On this menu 51, the user selects either the field 52 representing MODE 1 or the field 53 representing MODE 2, thereby setting his or her desired image stabilization control mode. This selection may be made using cross keys or ENTER button, which form parts of the operating section 9. Also, the control mode currently selected may be stored in a flash memory in the microprocessor 8, for example. Thus, the microprocessor 8 can know whether the control mode currently selected is MODE 1 or MODE 2.

2-2. Shooting Operation

Figure 6:
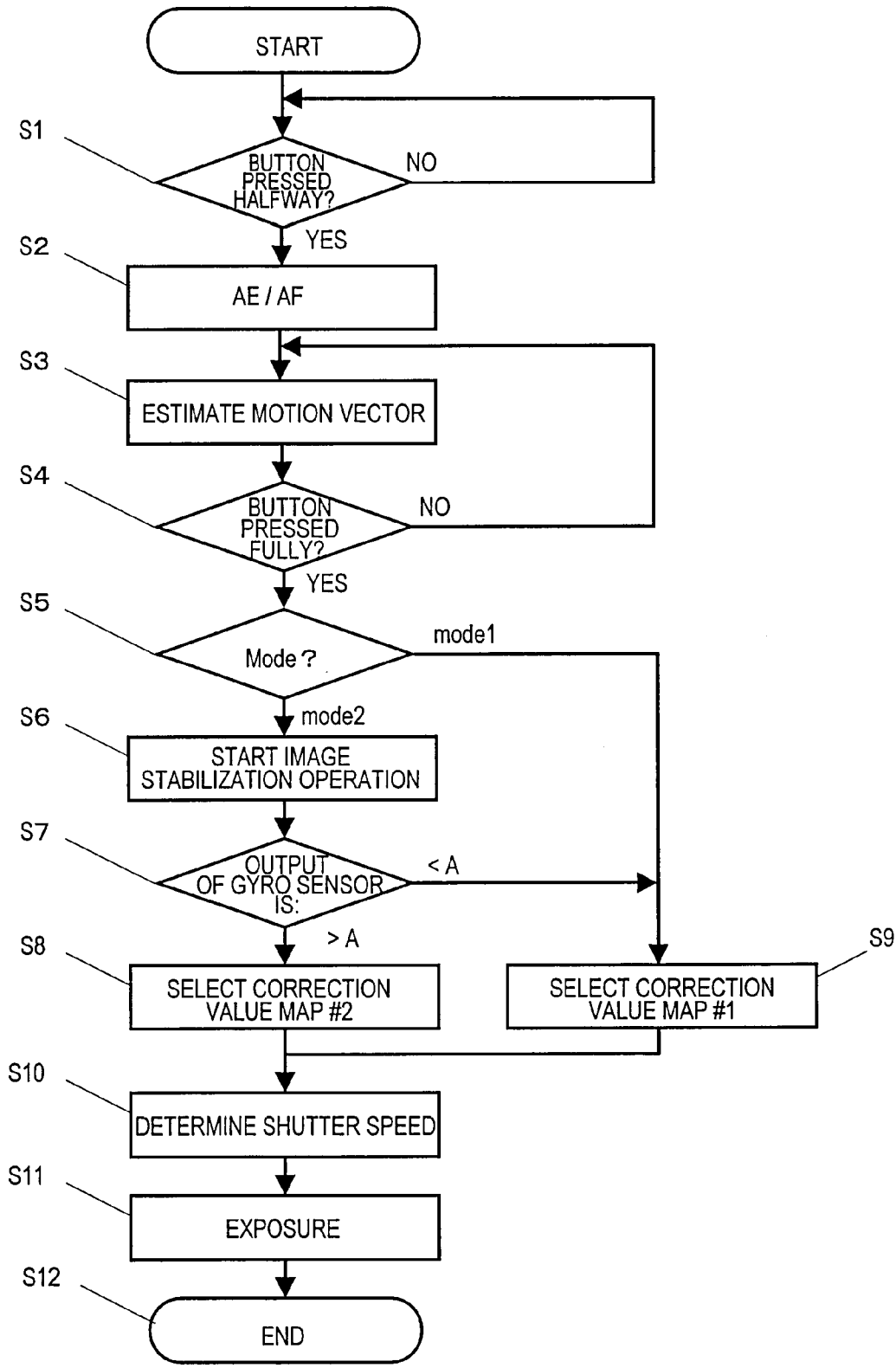
FIG. 6 is a flowchart showing the shooting operation to be done by the digital camera of the first preferred embodiment of the present invention.

FIG. 6 is a flowchart showing the shooting operation to be done by the digital camera.

First, the microprocessor 8 sees if the shutter release button has been pressed halfway (in Step S1). In that case, before a still picture is shot, the LCD monitor 5 presents a through-the-lens image. By making the LCD monitor 5 present a through-the-lens image, the user can determine the composition of the image to be shot while monitoring the through-the-lens image and can get the shooting operation done easily. The through-the-lens image is displayed on the LCD monitor 5 by performing the following processing. Specifically, the imager 2 converts the optical signal, which has entered the camera through the lens barrel 14, into an electrical signal. Then, the A/D converter 105 converts the electrical signal into a digital signal. The image processing section 3 subjects the digitized image data to preprocessing, YC conversion, electronic zoom processing and so on, thereby generating monitor image data. And when this monitor image data is input to the LCD monitor 5, the LCD monitor 5 presents a through-the-lens image. As used herein, the "through-the-lens image" refers to an image that will not be stored in the memory card 7 eventually.

When the user presses halfway the shutter release button, which forms part of the operating section 9 (i.e., if the answer to the query of Step S1 is YES), the microprocessor 8 performs AE processing and AF processing in parallel with each other in Step S2. In this preferred embodiment, the microprocessor 8 is supposed to perform the AE processing and the AF processing in parallel with each other. However, the present invention is in no way limited to this specific preferred embodiment. Alternatively, the microprocessor 8 may perform the AE processing and then the AF processing or perform the AF processing first and then the AE processing.

During the AE processing, the microprocessor 8 determines the exposure value based on the image data that has been processed by the image processing section 3. Then, the microprocessor 8 sets an appropriate shutter speed based on the exposure value. That is to say, the microprocessor 8 sets the exposure period of the imager 2 according to the exposure value. In this manner, the AE processing gets done by the digital camera. It should be noted that the shutter speed that has been set during the AE processing is a temporary setting. In a subsequent processing step, the microprocessor 8 will correct the shutter speed that was set during the AE processing to determine the final shutter speed.

In parallel with the AE processing, the microprocessor 8 adjusts the position of the focus lens 12 according to the contrast value of the image data that has been processed by the image processing section 3 such that the contrast value becomes a peak value. Actually, the focus lens 12 is moved by the focus lens driving section 103 under the control of the microprocessor 8. In this manner, the microprocessor 8 can get autofocusing processing done. That is to say, the AF processing also gets done by the digital camera (in Step S2).

Next, the microprocessor 8 gets the motion vector of the image data from the image processing section 34 (in Step S3). More specifically, the microprocessor 8 keeps getting motion vectors for a predetermined period of time or more until the shutter release button is pressed fully. Alternatively, the microprocessor 8 may always get motion vectors, too.

Subsequently, when the user presses the shutter release button fully (i.e., if the answer to the query of Step S3 is YES), the microprocessor 8 determines whether the image stabilization control mode currently selected is MODE 1 or MODE 2 (in Step S5). Also, the microprocessor 8 calculates the average of the motion vectors that had been gotten during the predetermined period until the shutter release button was pressed fully. And this average is used as a motion vector magnitude for obtaining a corrected shutter speed value. In this preferred embodiment, the average of motion vectors that have been gotten during a predetermined period is supposed to be used as a motion vector magnitude for obtaining a corrected shutter speed value. However, the present invention is in no way limited to this specific preferred embodiment. Alternatively, either the average of the absolute values, or the maximum value, of the motion vectors that have been gotten during the predetermined period may also be used.

If the microprocessor 8 has determined that the control mode currently selected is MODE 1 (i.e., if the answer to the query of Step S5 is mode 1), then the microprocessor 8 selects a method that uses a correction value map #1 as a method for obtaining a corrected shutter speed value (in Step S9). The correction value map #1 will be described later.

On the other hand, if the microprocessor 8 has determined that the control mode currently selected is MODE 2 (i.e., if the answer to the query of Step S5 is mode 2), then the microprocessor 8 controls the compensation lens driving section 104 to get an image stabilization operation started (in Step S6). More specifically, the microprocessor 8 calculates the degree of camera shake of the digital camera based on the output of the gyro sensor 10. Then, the compensation lens driving section 104 shifts the image stabilizer lens 11 in such a direction that cancels the camera shake under the control of the microprocessor 8.

Next, the microprocessor 8 determines whether or not the magnitude of the output of the gyro sensor 10 is greater than a predetermined value A (in Step S7). If the magnitude of the output of the gyro sensor 10 is smaller than the predetermined value A, then the microprocessor 8 advances the control process to Step S9. On the other hand, if the magnitude of the output of the gyro sensor 10 is greater than the predetermined value A, then the microprocessor 8 selects a method that uses a correction value map #2 as a method for obtaining a corrected shutter speed value (in Step S8). The correction value map #2 will be described later along with the correction value map #1.

Subsequently, the microprocessor 8 corrects the temporarily set shutter speed in accordance with either the correction value map #1 selected in Step S9 or the correction value map #2 selected in Step S8, thereby determining a final shutter speed value (in Step S10).

Next, the microprocessor 8 controls the imager 2 to get the exposure operation started. Thereafter, the microprocessor 8 controls the imager 2 and finishes the exposure operation when an exposure period, associated with the final shutter speed value, passes (in Step S11). Finally, the image processing section 3 subjects the image data captured to a predetermined type of processing under the control of the microprocessor 8, thereby writing processed image data on the memory card 7 and ending the series of shooting operations (in Step S12).

2-3. Relation Between Vector and Shutter Speed

As described above, the microprocessor 8 determines the exposure value based on the image data that has been processed by the image processing section 3 and then temporarily sets a shutter speed based on that exposure value. In the digital camera of this preferred embodiment, the microprocessor 8 corrects the temporarily set shutter speed based on the motion vector of the image data that has been processed by the image processing section 3 and on the image stabilization control mode. In that case, the corrected shutter speed value is determined in either Step S8 or Step S9. Hereinafter, a method for determining the corrected shutter speed value will be described with reference to FIG. 7.

Figure 7:
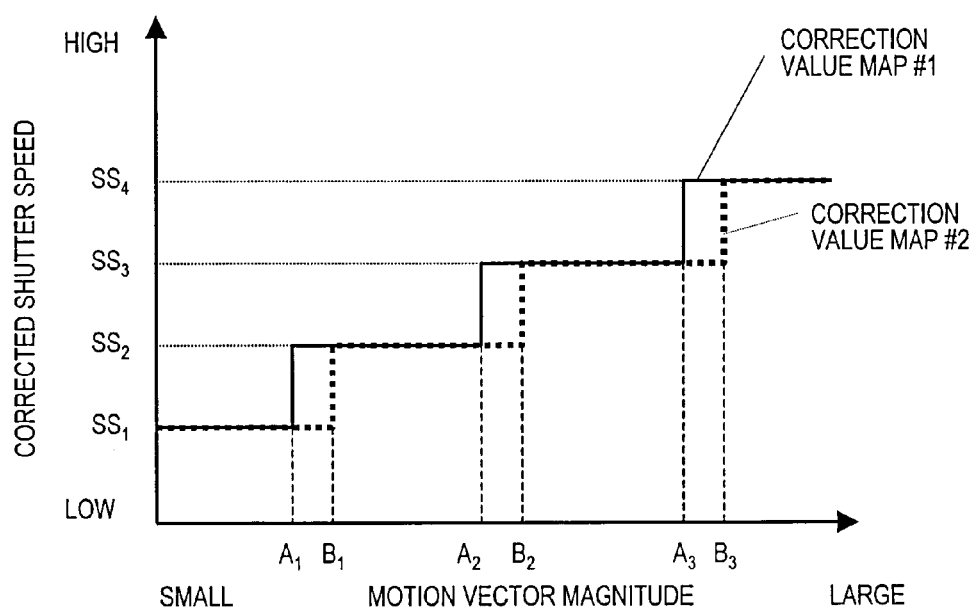
FIG. 7 shows how the corrected shutter speed value changes with the magnitude of a motion vector.

FIG. 7 shows a correlation between the motion vector, the image stabilization control mode, and the corrected shutter speed value.

If the image stabilization control mode currently selected is MODE 1, then the microprocessor 8 corrects the shutter speed value in accordance with the correction value map #1 shown in FIG. 7. That is to say, if the motion vector magnitude of the image data that has been processed by the image processing section 3 is equal to or smaller than A1, the microprocessor 8 selects SS1 as a corrected shutter speed value. On the other hand, if the motion vector magnitude is greater than A1 but equal to or smaller than A2, the microprocessor 8 selects SS2 as a corrected shutter speed value. Furthermore, if the motion vector magnitude is greater than A2 but equal to or smaller than A3, the microprocessor 8 selects SS3 as a corrected shutter speed value. And if the motion vector magnitude is greater than A3, then the microprocessor 8 selects SS4 as a corrected shutter speed value.

Meanwhile, if the image stabilization control mode currently selected is MODE 2, then the microprocessor 8 corrects the shutter speed value in accordance with the correction value map #2 shown in FIG. 7. That is to say, if the motion vector magnitude of the image data that has been processed by the image processing section 3 is equal to or smaller than B1, the microprocessor 8 selects SS1 as a corrected shutter speed value. On the other hand, if the motion vector magnitude is greater than B1 but equal to or smaller than B2, the microprocessor 8 selects SS2 as a corrected shutter speed value. Furthermore, if the motion vector magnitude is greater than B2 but equal to or smaller than B3, the microprocessor 8 selects SS3 as a corrected shutter speed value. And if the motion vector magnitude is greater than B3, then the microprocessor 8 selects SS4 as a corrected shutter speed value.

As shown in FIG. 7, if the motion vector magnitude is equal to or smaller than A1, greater than B1 but equal to or smaller than A2, greater than B2 but equal to or smaller than A3, or greater than B3, then SS1, SS2, SS3 or SS4 is respectively selected, as the same corrected shutter speed value for both MODE 1 and MODE 2. However, if the motion vector magnitude is greater than A1 but equal to or smaller than B1, or greater than A2 but equal to or smaller than B2, or greater than A3 but equal to or smaller than B3, the corrected shutter speed values are different between MODE 1 and MODE 2. For example, if the motion vector magnitude is greater than A1 but equal to or smaller than B1, then the microprocessor 8 determines SS2 and SS1 as corrected shutter speed values for MODE 1 and MODE 2, respectively. That is to say, the final shutter speed for MODE 2 becomes lower than the one for MODE 1.

As described above, the microprocessor 8 controls the shutter control section 101 such that if the motion vector magnitude is equal to a certain value (i.e., greater than A1 but equal to or smaller than B1, or greater than A2 but equal to or smaller than B2, or greater than A3 but equal to or smaller than B3 in this preferred embodiment), then the shutter speed for MODE 2 is lower than the one for MODE 1.

It should be noted that the present invention is applicable to any other situation as long as there are multiple image stabilization control modes with motion vector magnitudes that will result in mutually different corrected shutter speed values. For example, the present invention is applicable to a situation where the corrected shutter speed values are different between those control modes in just a part of the motion vector magnitude range as in the preferred embodiment described above and to a situation where the corrected shutter speed values are different between those control modes in the entire motion vector magnitude range.

2-4. Specific Operation 2-4-1. In MODE 1

Hereinafter, it will be described with reference to FIGS. 3 and 6 how the digital camera of this preferred embodiment operates if the image stabilization mode is MODE 1.

Suppose the user presses the shutter release button halfway at a time t11 before starting shooting (in Step S1). In response, the microprocessor 8 performs the AE processing and the AF processing.

Next, the microprocessor 8 obtains motion vectors from the image processing section 3 (in Step S3) and continues getting them until the user presses the button fully (in Step S4). And when the user presses the shutter release button fully at a time t13 (in Step S5), the process advances to Step S9 in which the shutter speed is corrected. At this point in time, the microprocessor 8 retains the motion vectors, which have been estimated by the motion detecting section 34 between the times t12 and t13, in the internal memory. The microprocessor 8 calculates the average of those internally retained motion vectors and then defines the average as a motion vector magnitude for use to determine a corrected shutter speed value. Also, since the image stabilization control mode currently selected is MODE 1, the microprocessor 8 obtains the corrected shutter speed value in accordance with the correction value map #1 shown in FIG. 7 (in Step S9). As the motion vector magnitude is obtained as described above, the microprocessor 8 determines the corrected shutter speed value based on that value and the relation shown in FIG. 7. Thereafter, the microprocessor 8 adds the corrected shutter speed value to the shutter speed value that has been temporarily set in Step S2, thereby determining the final shutter speed. For example, in a situation where the shutter speed is selectable from 1/8 seconds, 1/15 seconds, 1/30 seconds, or 1/60 seconds, if the temporarily set shutter speed is 1/15 seconds and the corrected value should be one level higher than the temporary one, then the final shutter speed becomes 1/30 seconds.

Thereafter, the imager 2 starts performing an exposure operation and continues the exposure for a period of time associated with the final shutter speed, thereby obtaining captured image data (in Step S11). Then, the image processing section 3 subjects the captured image data to predetermined processing and then stores it in the memory card 7. In this manner, a series of shooting operations in MODE 1 gets done.

In the example described above, as soon as the shutter release button is pressed fully at the time t13, the exposure operation is supposed to start immediately. However, there could be some time lag between the time when the button is pressed fully and the time when the exposure operation is started.

2-4-2. In MODE 2

Hereinafter, it will be described with reference to FIGS. 4 and 6 how the digital camera of this preferred embodiment operates if the image stabilization mode is MODE 2.

Suppose the user presses the shutter release button halfway at a time t21 before starting shooting (in Step S1). In response, the microprocessor 8 performs the AE processing and the AF processing.

Next, the microprocessor 8 obtains motion vectors from the image processing section 3 (in Step S3) and continues getting them until the user presses the button fully (in Step S4). And when the user presses the shutter release button fully at a time t23 (in Step S5), the microprocessor 8 starts performing an image stabilization control at the time t23 (in Step S6). At this point in time, the microprocessor 8 retains the motion vectors, which have been estimated by the motion detecting section 34 between the times t22 and t23, in the internal memory. The microprocessor 8 calculates the average of those internally retained motion vectors and then defines the average as a motion vector magnitude for use to determine a corrected shutter speed value.

Next, the microprocessor 8 determines whether or not the output of the gyro sensor 10 is greater than a predetermined value A. If the user is holding the digital camera with his or her hands, for example, the digital camera has significant camera shake. In that case, the output of the gyro sensor 10 should be greater than the predetermined value A. On the other hand, if the digital camera is fixed on a tripod, for example, then the digital camera has little camera shake. In that case, the output of the gyro sensor 10 should be smaller than the predetermined value A.

Supposing the output of the gyro sensor 10 is greater than the predetermined value A, the microprocessor 8 obtains the corrected shutter speed value in accordance with the correction value map #2 shown in FIG. 1 (in Step S9). As the motion vector magnitude is obtained as described above, the microprocessor 8 determines the corrected shutter speed value based on that value and the relation shown in FIG. 7. Thereafter, the microprocessor 8 adds the corrected shutter speed value to the shutter speed value that has been temporarily set in Step S2, thereby determining the final shutter speed (in Step S10).

On the other hand, if the output of the gyro sensor 10 is smaller than the predetermined value A, the microprocessor 8 obtains the corrected shutter speed value in accordance with the correction value map #1 shown in FIG. 7 (in Step S9). As the motion vector magnitude is obtained as described above, the microprocessor 8 determines the corrected shutter speed value based on that value and the relation shown in FIG. 7. Thereafter, the microprocessor 8 corrects the shutter speed value that has been temporarily set in Step S2 with the corrected shutter speed value, thereby determining the final shutter speed (in Step S10).

After that, the shooting operation in MODE 2 is performed as in MODE 1.

2-5. Why Shutter Speed should be Decreased if Camera Shake is Significant in MODE 2

As described above, if the image stabilization control mode is MODE 2, the image stabilizer lens 11 does not change its positions until just before a still picture starts to be shot (at the time t23), and the image stabilization control is started after that time that is just before the shooting is started. That is why even if the magnitude of the camera shake of the digital camera remains the same before and after the time t23, the blur of the subject's image on the imager 2 has different magnitudes before and after the time t23.

According to the present invention, the corrected shutter speed is obtained based on the motion vector magnitude, which is the average of the motion vectors that have been estimated until just before a still picture starts to be shot. For that reason, there is no problem if the magnitude of the image blur during the exposure operation is similar to that of the image blur while the motion vectors are being estimated. However, it is a problem if there is significant camera shake in MODE 2. That is to say, while motion vectors are being estimated, no image stabilization control is performed, and therefore, there is significant image blur. That is why if the shutter speed were corrected with a motion vector that has been estimated in such a state, then the shutter speed would be just increased. However, since the image stabilization control is performed during the exposure operation, there is little image blur. That is why even if the shutter speed is not increased, an image can be shot with little blur. Therefore, if there is significant camera shake in MODE 2, the magnitudes of image blur will be different while the motion vectors are being estimated and while the exposure operation is being performed. Consequently, if the shutter speed were just corrected according to the motion vector magnitude estimated, then the shutter speed would be increased more than necessarily.

For that reason, if the camera shake is significant in MODE 2, the shutter speed is set based on the correction value map #2 that is different from the one used in MODE 1. That is to say, the microprocessor 8 controls the shutter control section 101 such that if the motion vector magnitude is equal to a certain value (i.e., greater than A1 but equal to or smaller than B1, or greater than A2 but equal to or smaller than B2, or greater than A3 but equal to or smaller than B3 in this preferred embodiment), then the shutter speed for MODE 2 is lower than the one for MODE 1.

On the other hand, if the camera shake is little, the magnitude of the image blur remains the same even in MODE 2 just before and after the exposure operation (at the time t23). That is why the shutter speed is set based on the same correction value map as the one used in MODE 1.

Embodiment 2

The first preferred embodiment of the present invention described above could be modified in various manners as long as those modifications fall within the scope of the present invention. Those modified examples will be described collectively as a second preferred embodiment of the present invention.

In the first preferred embodiment of the present invention described above, the exposure period of the imager 2 is supposed to be set using an electronic shutter. However, the present invention is in no way limited to that specific preferred embodiment. Alternatively, the exposure period may also be controlled by providing a mechanical shutter for the imager 2 such that the mechanical shutter faces the subject and by adjusting the shutter speed of that mechanical shutter.

Also, in the first preferred embodiment of the present invention described above, two control modes called MODES 1 and 2 are supposed to be used as the image stabilization control modes. However, the present invention is in no way limited to that specific preferred embodiment. For example, a third control mode may be further provided. In short, there may be a plurality of control modes in which the image stabilization function is controlled differently.

Furthermore, in the first preferred embodiment of the present invention described above, a temporary shutter speed is supposed to be set and then corrected. Alternatively, the shutter speed may also be determined directly based on the image stabilization mode, motion vector and exposure value.

Also, in the first preferred embodiment of the present invention described above, the AF processing is supposed to be performed in Step S2 shown in FIG. 6. Optionally, the present invention could also cope with a manual focus operation instead of performing the AF processing.

Furthermore, in the first preferred embodiment of the present invention described above, the motion of an image shot is supposed to be detected by estimating a motion vector. However, the present invention is in no way limited to that specific preferred embodiment. Alternatively, the motion of an image shot can also be figured out by calculating the differences between the pixel values of the previous and next frames and integrating them together. In any case, the present invention is applicable to any situation as long as the motion of an image shot can be calculated.

Optionally, in the first preferred embodiment of the present invention described above, the gain to the image data may be controlled according to the shutter speed value. For example, if the shutter speed is high, a dark image may be brightened by increasing the gain. On the other hand, if the shutter speed is low, the noise of an image shot may be reduced by decreasing the gain. In the first preferred embodiment of the present invention, the image data that has been digitized by the pre-processing section 31 may have its gain controlled. However, the present invention is in no way limited to that specific preferred embodiment. For example, the image data as an analog signal may have its gain controlled before passed to the A/D converter 105.

INDUSTRIAL APPLICABILITY

The present invention is applicable for use in an image capture device that has multiple image stabilization control modes. Specifically, the present invention can be used effectively in a digital still camera or a cellphone with a camera function, for example.

The invention claimed is:

1. An image capture device with an ability to adjust an exposure value for shooting an image, the device comprising:
   a motion detecting section for detecting a motion of an image shot;
   a blur compensating section for optically compensating for a blur of the image shot;
   a mode selecting section for selecting one of multiple control modes for the blur compensating section; and
   a setting determining section for determining a setting related to an exposure value for shooting an image based on the control mode selected by the mode selecting section and the motion of the image shot that has been detected,
   wherein the control modes of the blur compensating section include a first control mode and a second control mode,
   wherein in the first control mode, the blur compensating section performs to compensate the blur of the image shot since before an instruction to shoot an image instructed by the user is received,
   wherein in the second control mode, the blur compensating section starts or enhances the operation of compensating for the blur of the image shot after an instruction to shoot an image instructed by the user is received,
   wherein the motion detecting section detects, according to the control mode selected by the mode selecting section, the motion of the image shot that has been compensated by the blur compensating section, or the motion of the image shot that has not been compensated by the blur compensating section, using a motion vector, and
   when the motion of the image shot that has been detected by the motion detecting section is within a predetermined range,
   the setting determining section determines:
   a first setting value as the setting related to an exposure value if the control mode selected by the mode selecting section is the first control mode; and
   a second setting value as the setting related to an exposure value if the control mode selected by the mode selecting section is the second control mode,
   wherein the exposure value related to the second setting value is greater than the exposure value related to the first setting value.

2. The image capture device of claim 1, further comprising a shutter,
   wherein the device is able to control the exposure value for shooting an image by adjusting a shutter speed of the shutter, and
   wherein the setting determining section determines the shutter speed based on the control mode selected and the motion of the image shot that has been detected.

3. The image capture device of claim 2, wherein the shutter is at least one of a mechanical shutter and an electronic shutter.

4. The image capture device of claim 1, wherein:
   a first map and a second map, each of which associates motions of the image shot and the settings related to exposure values, are defined in advance; and
   when the motion of the image shot that has been detected by the motion detecting section is within a predetermined range,
   the setting determining section determines an exposure value in accordance with the first map if the control mode selected is the first control mode, while determines the exposure value in accordance with the second map if the control mode selected is the second mode, wherein:
   the exposure value determined in accordance with the second map is greater than the exposure value determined in accordance with the first map.

* * * * *